(12) United States Patent
Hegstrand et al.

(10) Patent No.: US 9,235,331 B1
(45) Date of Patent: Jan. 12, 2016

(54) SYSTEMS AND METHODS FOR PROVIDING SALES CONTENT

(75) Inventors: John Hegstrand, Osseo, MN (US);
Dion L. Kells, Norwood, MN (US);
David Vega, Chanhassen, MN (US);
Jason R. Clark, Buffalo, MN (US);
Ross Olson, Plymouth, MN (US);
Aleshia Hansen, Mound, MN (US);
Joshua Moe, Apple Valley, MN (US);
Brent Schmidtbauer, Rogers, MN (US)

(73) Assignee: General Mills, Inc., Minneapolis, MN (US)

( * ) Notice: Subject to any disclaimer, the term of this patent is extended or adjusted under 35 U.S.C. 154(b) by 330 days.

(21) Appl. No.: 13/549,963

(22) Filed: Jul. 16, 2012

(51) Int. Cl.
*G06F 3/00* (2006.01)
*G06F 3/0484* (2013.01)

(52) U.S. Cl.
CPC .................................. *G06F 3/0484* (2013.01)

(58) Field of Classification Search
None
See application file for complete search history.

(56) References Cited

U.S. PATENT DOCUMENTS

| | | | |
|---|---|---|---|
| 2009/0259514 A1* | 10/2009 | Kumar et al. | 705/9 |
| 2010/0037151 A1* | 2/2010 | Ackerman et al. | 715/753 |
| 2011/0040598 A1* | 2/2011 | Brady et al. | 705/8 |
| 2012/0179981 A1* | 7/2012 | Whalin et al. | 715/753 |

OTHER PUBLICATIONS

Model Metrics, "2GO Cloud Platform Digital Sales Aid for iPad", www.modelmetrics.com, (1 page).
Model Metrics, "Digital Sales Aid for iPad", Aug. 29, 2011, http://appexchange.salesforce.com/listingDetail?listingId=a0N300000057ZOHEA2 (4 pages).
Model Metrics, "DSA User Guide", 2011, http://www.modelmetrics.com/dsauserguide/FAQ_Users.html (7 pages).
Model Metrics, "2GO demos", 2011, http://www.modelmetrics.com/2go-demos/ (3 pages).
Model Metrics, "Digital Sales Aid Admin Guide", 2011, http://www.modelmetrics.com/dsaadminguide/ (31 pages).
Model Metrics, "Digital Sales Aid for iPad", 2011, http://www.modelmetrics.com/serviceofferings/mobile/digitalsalesaidforipad/ (2 pages).
Model Metrics, "Digital Sales Aid for iPad", www.modelmetrics.com, (1 page).
Model Metrics, "Mobile Sales Aid", http://www.modelmetrics.com/mobile/mobile-sales-aid/ (1 page).
Silverman, Ed, "Novartis, The iPad & 35,000 More Visits to Docs", UBM Canon, Mar. 28, 2011, http://www.pharmalot.com/2011/03/novartis-the-ipad-35000-more-visits-to-docs/ (8 pages).
Model Metrics, "Model Metrics Lifts the Barriers to Enterprise Cloud Mobilization", Oct. 5, 2011, http://www.marketwire.com/printer_friendly?id=1569324 (2 pages).
Indrieri, K., "Model Metrics Launches Digital Sales App on Salesforce.com's AppExchange Mobile", Model Metrics, Nov. 30, 2011, http://www.modelmetrics.com/about-us/press-releases/dsa-on-the-appexchange/ (3 pages).

* cited by examiner

*Primary Examiner* — Anil N Kumar
(74) *Attorney, Agent, or Firm* — Paul LaVanway; Gregory P. Kaihoi

(57) ABSTRACT

In one aspect, a method for providing sales content that can include displaying a home page using a computing device such as a tablet computer is disclosed. The home page can include a meeting page element and content area elements. The meeting page element can link to at least one meeting presentation page. Content area elements can link to at least one content selection page which can include one or more selection controls. Selection controls can correspond to a respective content portion and can have a state indicating the selection status of the corresponding content portion. If one of the selection controls has the "selected" state, the processing circuitry can add the respective content portion, and a content portion element, which can be linked to the respective content portion, to the meeting presentation page. The electronic display of the computing device can be used to display a meeting presentation page.

21 Claims, 12 Drawing Sheets

SYSTEMS AND METHODS FOR PROVIDING SALES CONTENT

FIELD

This disclosure relates generally to the field of sales presentations and more specifically to the field of delivering sales content. This disclosure also relates to preparing for sales meetings, and for providing dynamic sales information.

BACKGROUND

Suppliers (manufacturers, producers, vendors and/or processors) who desire to sell products to consumers often sell wholesale quantities to retailers, who then resell the goods directly to consumers. In selling to retailers, suppliers have found that a unified sales message as well as an efficient sales presentation can be advantageous. As some suppliers provide products to a large number, and wide variety of retailers, and those retailers may extend over a large geographical area, a large sales force may sometimes be required.

Many retailers stock a wide variety of items, and so must continuously purchase those items in order to maintain stocked merchandise for consumers. While a retailer may be generally categorized (e.g. department store, convenience store, grocery store, etc.), some retailers stock a sufficiently wide variety of products that they must employ a staff of purchasers in order to ensure that purchasing decisions and logistical details can be appropriately planned and executed.

Each sales agent of a supplier's sales force may need to meet with many purchasers from a variety of retailers. While a supplier may organize their sales force to cover sales of their products according to the structure of their brands or products, for example, a retailer may structure their purchasers according to departments within a store, for example. Accordingly, sales agents may be called upon to deliver a wide variety of sales presentations that preferably can be tailored to the particular purchasing audience. In some cases, information presented in a sales meeting originates from a wide variety of subject matter experts, who package their information for delivery in a wide variety of formats that may not be mutually compatible.

SUMMARY

In one aspect, the invention features a method for providing sales content that can include displaying a home page using a computing device that can have processing circuitry and an electronic display. The home page can include a meeting page element and a plurality of content area elements. The meeting page element directly or indirectly can link to at least one meeting presentation page. Each of the plurality of content area elements, directly or indirectly, can link to at least one content selection page which can include one or more selection controls. Each one of the selection controls can correspond to a respective content portion and can have a state indicating the selection status of the corresponding content portion. The state can be at least one of the following: "selected" and "unselected."

The state of the selection controls can be determined with the processing circuitry. If one of the selection controls has the "selected" state, the processing circuitry can add the respective content portion, and a content portion element, which can be linked to the respective content portion, to the meeting presentation page. The electronic display of the computing device can be used to display a meeting presentation page.

In another aspect, the invention features a system for providing sales content which can include a portable computing device that has an electronic display and processing circuitry. The processing circuitry can be configured to display a home page on the electronic display, and the home page can include a meeting page element and a plurality of content area elements. The processing circuitry can detect manipulation of the meeting page element and after it has detected manipulation of a meeting page element, it can display a meeting presentation page. The processing circuitry can also detect manipulation of a content area element, and after it has detected manipulation of a content area element it can display a content selection page corresponding to the manipulated content area element.

The processing circuitry can also display a selection control on the content selection page corresponding to a content portion. The processing circuitry can determine the state of the selection control; the state can be "selected" or "unselected." If the state of the selection control is "selected" then the processing circuitry can add a content portion element to the meeting presentation page, where the content portion element is linked to the corresponding content portion.

The processing circuitry can also display the meeting presentation page using the electronic display. The processing circuitry can detect manipulation of the content portion element on the meeting presentation page and after it has detected manipulation of the content portion element, it can display the corresponding content portion.

In another aspect, the invention can feature a method to build a meeting presentation page with a tablet computer. The tablet computer can provide access to sales content, and it can be used for viewing the sales content, during a sales meeting.

A user can open a sales application by manipulating an application graphical user interface (GUI) element with the tablet computer. A user can then navigate to a home page of the sales application. The home page can have a meeting page GUI element which can provide access to the meeting presentation page and a content area GUI element which can provide access to a content selection page. A user can manipulate one or more GUI elements to display the content selection page using the tablet computer, starting by manipulating at least the content area GUI element located on the home page. A user can then manipulate a GUI selection control on the content selection page in order to change access from the meeting presentation page to the content portion that corresponds to the GUI selection control.

One or more of the following features can also be included. In some embodiments, the meeting page element can be indirectly linked to at least two meeting presentation pages, and one of those meeting presentation pages can be selected as "active." If one of the selection controls has the "selected" state, the processing circuitry can determine which of the meeting presentation pages has been selected as active, and add the respective content portion, and a content portion element, which can be linked to the respective content portion, to the active meeting presentation page. In some embodiments, if one of the selection controls has the "selected" state, then the active meeting presentation page can also include the corresponding selection control. Thus, if one of the selection controls has the "selected" state, the processing circuitry can add the respective content portion, a content portion element, which can be linked to the respective content portion, and that selection control, to the active meeting presentation page. This can be so that if the selection control on the active meeting presentation page is then set to the deselected state, the respective content portion, and the content portion element linked to the respective content portion, can be removed from the active meeting presentation page.

BRIEF DESCRIPTION OF THE DRAWINGS

The following drawings illustrate some particular embodiments of the present invention and therefore do not limit the scope of the invention. The drawings are not necessarily to scale (unless so stated) and are intended for use in conjunction with the explanations in the following detailed description. Some embodiments will hereinafter be described in conjunction with the appended drawings, wherein like numerals denote like elements.

DETAILED DESCRIPTION OF THE PREFERRED EMBODIMENTS

Figure 1:
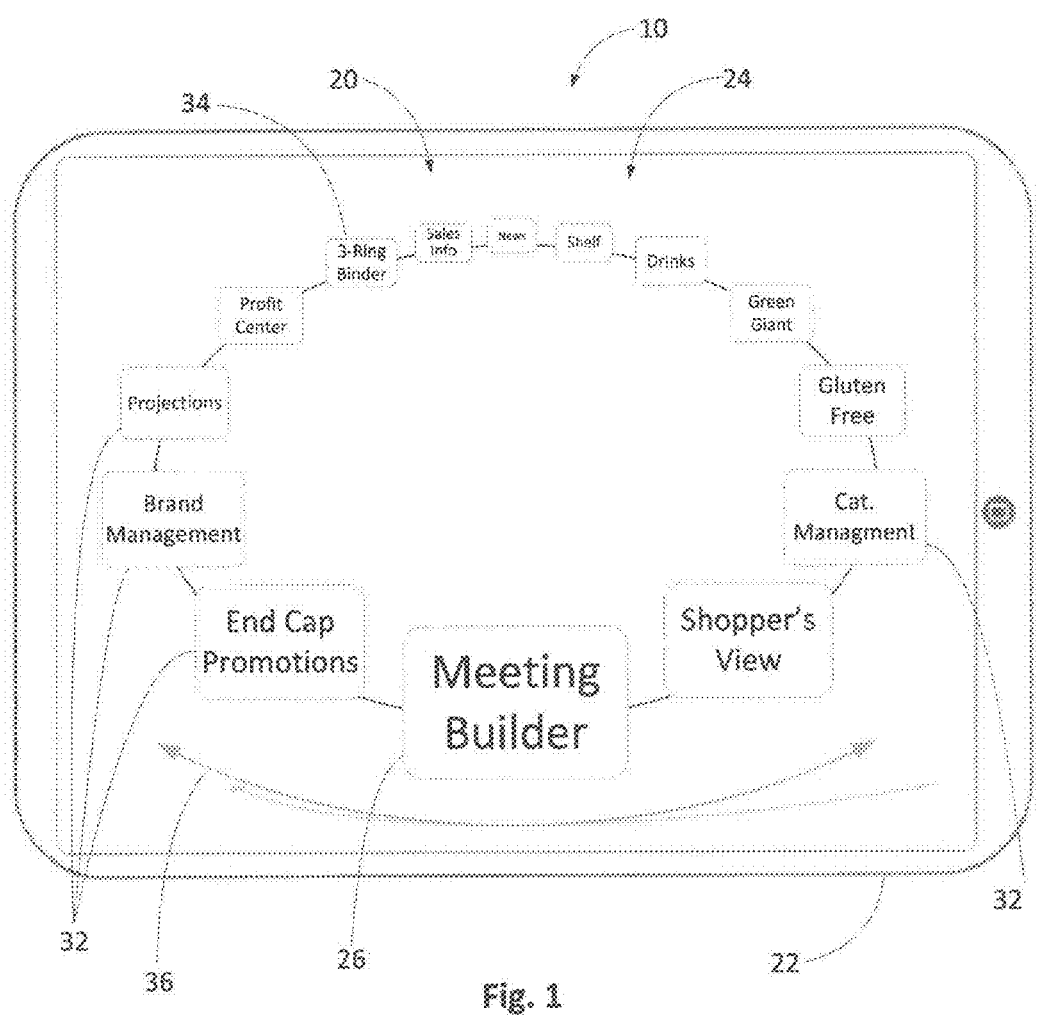
FIG. 1 is a depiction of a system for providing sales content including a tablet with a graphical user interface displaying a home page according to some embodiments.

The following detailed description is exemplary in nature and is not intended to limit the scope, applicability, or configuration of the invention in any way. Rather, the following description provides some practical illustrations for implementing some embodiments of the invention. Examples of hardware configurations, systems, processing circuitry, data types, programming methodologies and languages, communication protocols, and the like are provided for selected aspects of the described embodiments, and all other aspects employ that which is known to those of ordinary skill in the art. Those skilled in the art will recognize that many of the noted examples have a variety of suitable alternatives.

Suppliers often would like to provide clients with relevant and up to date sales and marketing information; information that is important to each client. Sometimes, it is not possible to anticipate the information needed by a client during a sales meeting. If that information is not quickly accessible, it can often mean a lost sales opportunity with that customer. During a sales presentation, a preassembled array of information can be reviewed with each client; often, each presentation is unique to the client. The information can be very thorough, and in order to make the sales call run smoothly and quickly, suppliers often want each item (or most items) of the preassembled array to comprise a unified and consistent sales message.

One way to achieve a unified message is to provide standard marketing materials that can be used by sales agents. To this end, suppliers can produce a number of advertisements (ads) that feature similar, related or progressive themes, which can build upon successful messages. Ads can be produced in a wide variety of formats, for example, print, in-store displays, television, or radio, to name a few. Suppliers can also produce video clips that can be specifically tailored for presentations to purchasers. Videos, and other multi-media presentations are used due to their ability to attract and retain the attention of a viewer, and also because the message—both verbal and visual—can be carefully planned and produced and then on presentation, the message can be consistently delivered.

Suppliers who provide numerous products to many retailors through a large sales force may find that the sheer volume of unified message content can be overwhelming. According to some embodiments, a system and/or method can be used by a sales agent to streamline their preparations for sales meetings. For example, a sales agent may be tasked with many sales calls covering a wide variety of sales presentations to a range of audiences. According to some embodiments, a system/method can facilitate creating, organizing, and updating tailored sales presentations to be given by the sales agent. The presentations can be an aggregation of materials from a variety of sources, and displaying those in a seamless sales presentation can enhance the sales opportunity.

In some cases, embodiments can enable a sales agent to dynamically access content. As many sales agents know, responding to an audience question "in the moment" is valuable, far more valuable than a response the next day, or even later in the same day. Providing dynamic access to organized content can offer important advantages in a sales meeting.

As a sales agent prepares to meet with a buyer, the sales agent can plan on certain content that may be covered during the sales presentation. The sales agent will often have certain sales content that they will want to cover, certain content that they anticipate the buyer will request, and perhaps a third list of content that would be prudent to have available because a buyer may, or may not request that content. A fourth list of content can include everything else that a sales agent can present if requested, but the sales agent does not know if any of it will be needed. Some embodiments can facilitate a sales agent's preparations and/or delivery of content for one, two, three, or all four of these aspects or other types or categories of content.

As will be discussed further herein, in some embodiments selected sales content can optionally be organized into meetings, each meeting providing a hub from which to launch the sales content. In some cases content that will be used for more than one sales presentation can be added to more than one meeting. In some cases other content can be available on standby; some content can be launched virtually immediately if the information is requested, while some content can be available as back-up—if the content is needed, it can be found and displayed.

For convenience and ease of understanding, embodiment(s) including a portable computing device will now be described. The processing circuitry of the portable computing device can execute a software application—that can be used in order to provide sales content. The sales content can be provided using the computing device, such as with an electronic display of the computing device, or it can be provided using an external device, such as an external monitor or external speakers, for example. The processing circuitry may include a number of well-known components. For example, in some cases processing circuitry can include a programmable processor and one or more non-transitory memory modules or components. The functioning software application includes machine readable instructions that can be stored in the memory module(s) for programming the processor to provide one or more aspects, features, and/or functions of the systems and/or methods.

The term "non-transitory" is used herein to indicate that a computer readable medium is a physical medium that stores instructions, and is not a transitory signal per se. The term "non-transitory" includes other types of computer readable media such as internal or removable storage devices used within or in conjunction with a computer processor at run time and/or for longer term data retention, including volatile and/or non-volatile forms. As just a few nonlimiting examples, a non-transitory computer readable storage medium can be any one of a number of memory devices normally included in or used with a computer processor. Such examples may include a CD ROM, a DVD ROM, a hard disk, RAM, and other such devices.

Of course other configurations of, e.g., hardware, software, firmware, etc., are possible in order to implement a computing device (e.g., portable or otherwise) and it should be appreciated that embodiments described herein are not limited to any particular configuration or example, including the examples described herein. Those skilled in the art will appreciate that other configurations and implementations may be used to implement the teachings in this disclosure.

In some embodiments, a system and/or method for providing up to date sales content that can be used to streamline preparing sales meeting presentations and for providing dynamic sales information can be implemented through the use of a software suite application that has been loaded on a portable computing device. Content can be loaded onto the portable computing device in a plurality of ways, that can include, for example, from a local storage unit, a portable storage drive, a removable media element, and/or a network database. In some cases loading data can be accomplished over a wireless connection and/or via a hardwire connection.

As will now be described, in some embodiments, a system including a portable computing device can be provided in the form of a tablet computing device loaded with machine executable instructions in the form of a software application or suite of applications that runs on processing circuitry within the tablet computing device. In some cases sales content can be delivered using a tablet computing device with such software, or may be at least partially delivered using such a combination of a tablet computing device and software.

Tablet computing devices, sometimes referred to as tablets, or as tablet computers, are generally planar, lightweight devices that include processing circuitry and that have an electronic touch-screen display. Generally tablets have a rectangular form factor and can have wireless communications capability, which can include 3G/4G and Wi-Fi networking. Tablets can provide a viewing screen that is suitable for a sales presentation. In addition, the use of a touch screen device enables a sales agent to easily manipulate the displayed information (without the need for a keyboard or mouse) which can contribute to an enhanced audience-orientated dynamic during the sales presentation. As a result, tablets can provide an excellent hardware platform. A common commercial example of a tablet computing device is the popular iPad® mobile digital device from Apple Inc.

Some embodiments are described herein as providing a graphical user interface (GUI), including one or more pages of content, interactive graphical elements, and/or controls. These and other various aspects of GUI design and implementation are well known, and for conciseness, will not be discussed in great detail. Briefly, graphical elements can often be found in the form of an icon or control, and can provide a means for a user to visually interact with the computer's processing circuitry, memory and/or software. As just a few simple and readily understood examples, graphic elements and/or controls making up part of a GUI can provide a way for a user to launch a software program (e.g., by tapping an icon-element), save changes made to a content file (e.g., by tapping a "save" icon-element), view content (e.g., by tapping an element that is a thumbnail of a picture), and the like.

In this disclosure, references are made to "tapping" on a graphical user interface element that is displayed on a tablet. Tapping is used herein as a simple reference for any suitable type of manipulation of a displayed element according to the specifications of the tablet and/or the expected input from a software application, and can include manipulations including, but not limited to, a single tap, a double tap, a tap and hold, or other gestures. In this disclosure, reference is also made to "causing content to launch" or "causing a page to load." Such references should be read to mean that a user's interaction with a tablet's touch sensitive screen (e.g., manipulation of interface elements on the screen) causes the tablet's processing circuitry to execute commands in order to achieve the described result.

In this disclosure, reference is also made to selection controls having one of two states: "selected" or "unselected," and a user's ability to change the states from selected to unselected, and vice-versa. Such references should be understood to mean that a user's interaction with the selection control changes the displayed status of the selection control, according to the coded software instructions. The displayed status of each selection control also results in the processing circuitry carrying out the functions associated with the particular status of the selection control (selected or unselected), also according to the coded software instructions.

Referring to the Figures, a system and method for providing sales content is disclosed according to some embodiments. As depicted in FIG. 1, a system 10 for providing sales content includes a computing device in the form of a tablet 22. The tablet 22 is programmed with computer executable instructions provided as a software suite that generates a graphical user interface (GUI) 20 for providing the sales content with the tablet 22. For example, as discussed above, the tablet 22 has processing circuitry that may include one or more programmable processors and memory components storing the executable instructions that cause the system 10 to provide the desired functionality.

As shown in FIG. 1, in some cases the GUI 20 has a home page 24. The home page 24 displayed on the tablet 22 can include a meeting page element 26, a plurality of content area elements 32, and one or more user content page elements 34. As depicted in FIG. 1, the elements can be swiped left or right, as indicated by the arrow 36, in order to move each element around the icon circle, and in succession bring each icon to the foreground. Each element can be a text-only icon, as depicted in FIG. 1. Alternatively, elements can be color-coded in order to accommodate grouping the elements according to a user's preferred parameters; element icons can also have differently shaped outlines (e.g. circles, hexagons, clouds, or more complex or compound shapes); elements can include text and/or graphics, in order to assist in making the elements more distinctive, one from the other, and thus easier to locate on the icon circle; or the elements can include any combination of these alternative or any other desirable visual presentations.

Each element can be linked to another page, or to content. Tapping on an element can load the linked page, or the linked content. Some linked pages, which are described in detail below, can be landing pages, which can contain one or several elements, which in turn can be linked to other pages or content. A landing page is an intermediate page that is used in order to help visually group content, and may have one or more elements that are linked to other pages. A user can then navigate to those other pages by selecting the linking elements. A selection page is any page from which content can be selected for inclusion in a meeting (which is described in greater detail below). In some cases, content may also be selectable from a content landing page. Tapping on an element that is linked to content (which is described in greater detail below), for example from a content landing page, can cause the content to launch, enabling a user to view the content.

Figure 2:
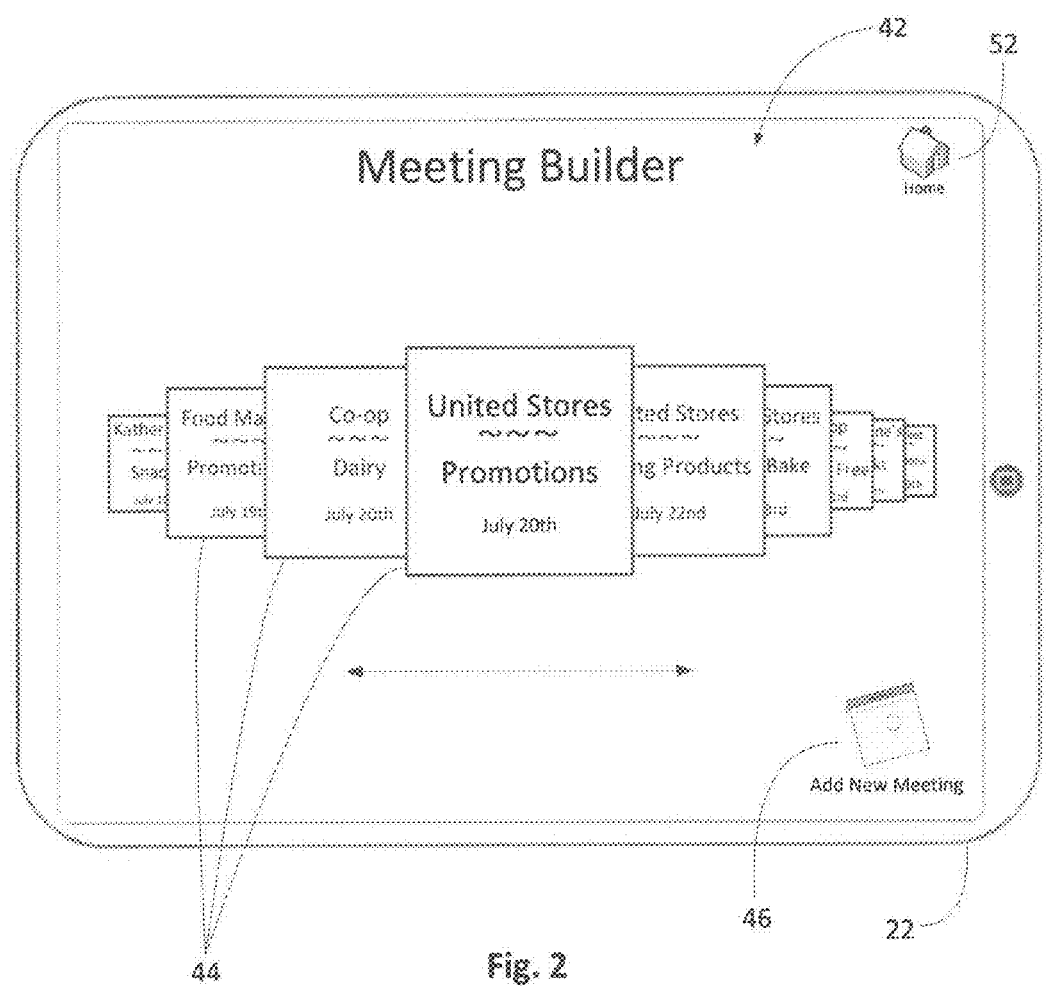
FIG. 2 is a depiction of a system for providing sales content including a tablet with a graphical user interface displaying a meetings landing page according to some embodiments.

Tapping on the meeting page element 26 can launch the meetings landing page 42, according to some embodiments, and as depicted in FIG. 2. The meetings landing page 42 can be a landing page that can be used to visually group sales meetings, by containing one or more sales meeting elements 44. As depicted in FIG. 2, the central portion of the meetings landing page can display the meeting elements 44, which can be swiped left or right in order to bring each particular meeting element, in succession, to the foreground. Each of the sales meeting elements 44 can be linked to a meeting presentation page (which is described in greater detail below), and tapping on a sales meeting element can cause the linked meeting presentation page to load.

Opening the meetings landing page 42 can enable a user to see the sales meeting elements 44 that are currently available. As each sales meeting element is linked to a meeting presentation page, a user viewing the sales meeting landing page can quickly determine the available meeting presentation pages. A new sales meeting element 44 can be added to the meetings landing page 42 by tapping on the new sales meeting control 46. Creating a new sales meeting element also creates a new, and linked, meeting presentation page. Tapping on the home element 52 can enable a user to return to the home page 24.

In a similar fashion to the elements found on the home page 24, each element on the meetings landing page 42 can be displayed in any suitable or desirable fashion, including as a text-only icon, as depicted in FIG. 2. Alternatively, the elements can be color coded, shaped, include graphics (which can correspond to each retailer's logo, or to a graphical representation of a meeting's subject matter), or any combination of these alternatives. Alternate visual presentations can assist a user to locate a particular element quickly by providing a visual grouping of the icons. Any number of grouping parameters can be used, and can include, for example: by meeting date, by retailer, or by meeting subject.

Returning to FIG. 1, in some embodiments, tapping on a content area element 32 from the home page 24 can launch a linked and corresponding content selection page. Two embodiments of content selection pages 54' and 54" are depicted in FIGS. 3 and 4.

Figure 3:
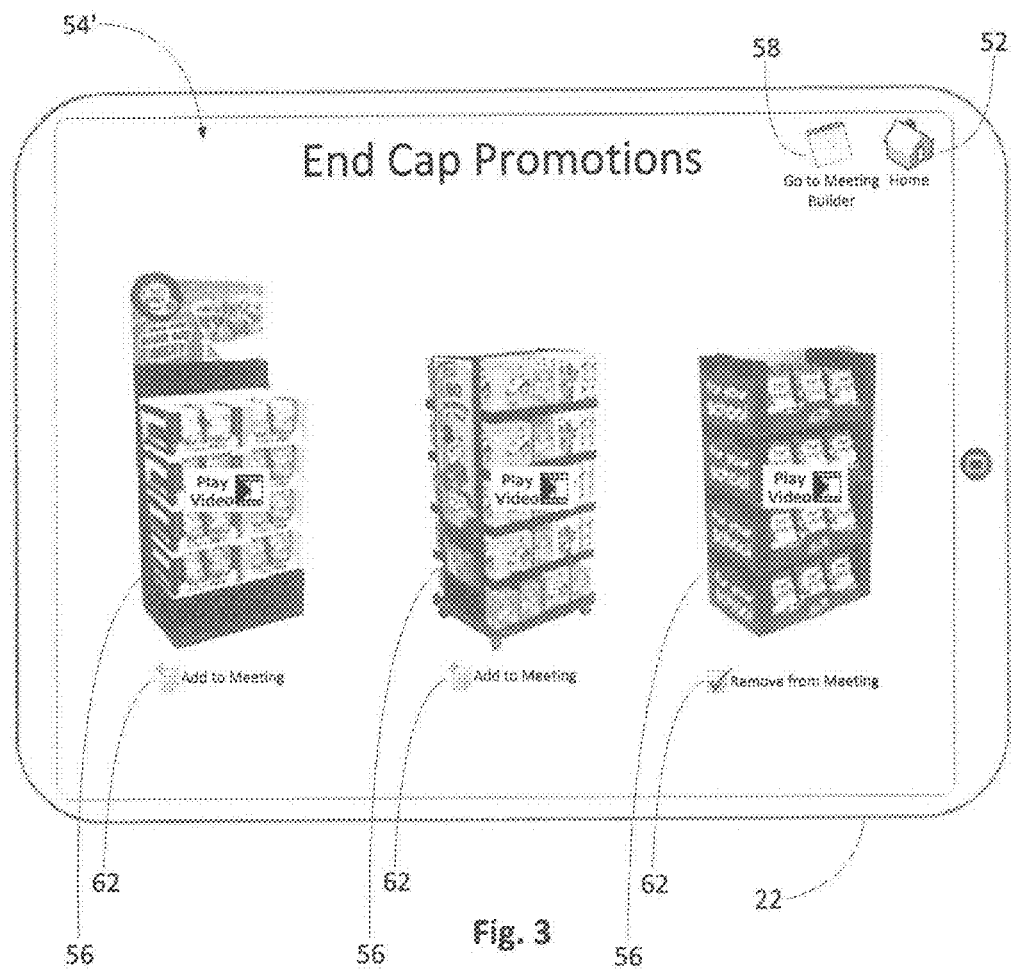
FIG. 3 a depiction of a system for providing sales content including a tablet with a graphical user interface displaying a content selection page according to some embodiments.
Figure 4:
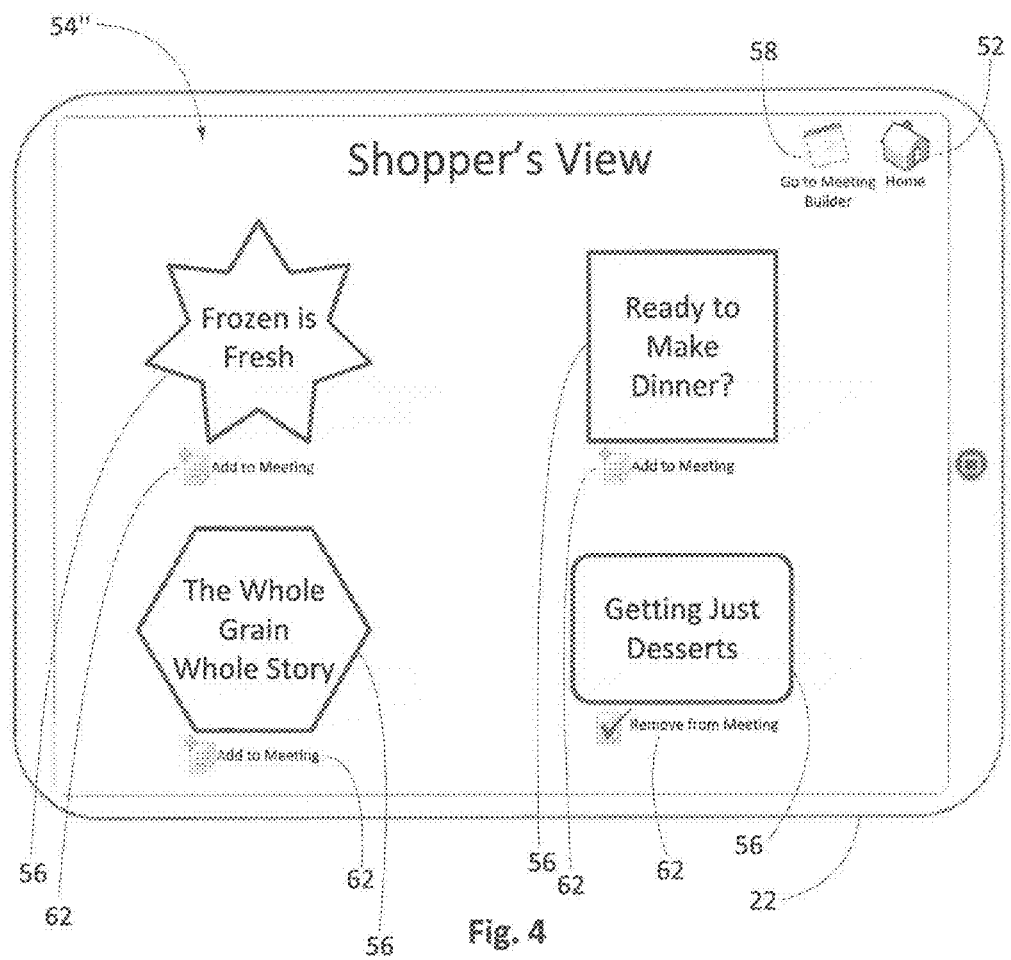
FIG. 4 is a depiction of a system for providing sales content including a tablet with a graphical user interface displaying a content selection page according to some embodiments.

In the embodiment depicted in FIG. 3, a first example of a content selection page 54' contains three content portion elements 56, each of which can be linked to a content portion. In this example, each content portion is a video clip, and the content portion elements 56 can include an indication that the content can be played, as shown. In this example, each of the video clips depicted in the figure relate to information regarding end cap promotions, and as a result all three can optionally be grouped in the same content selection page 54'.

Figure 9A:
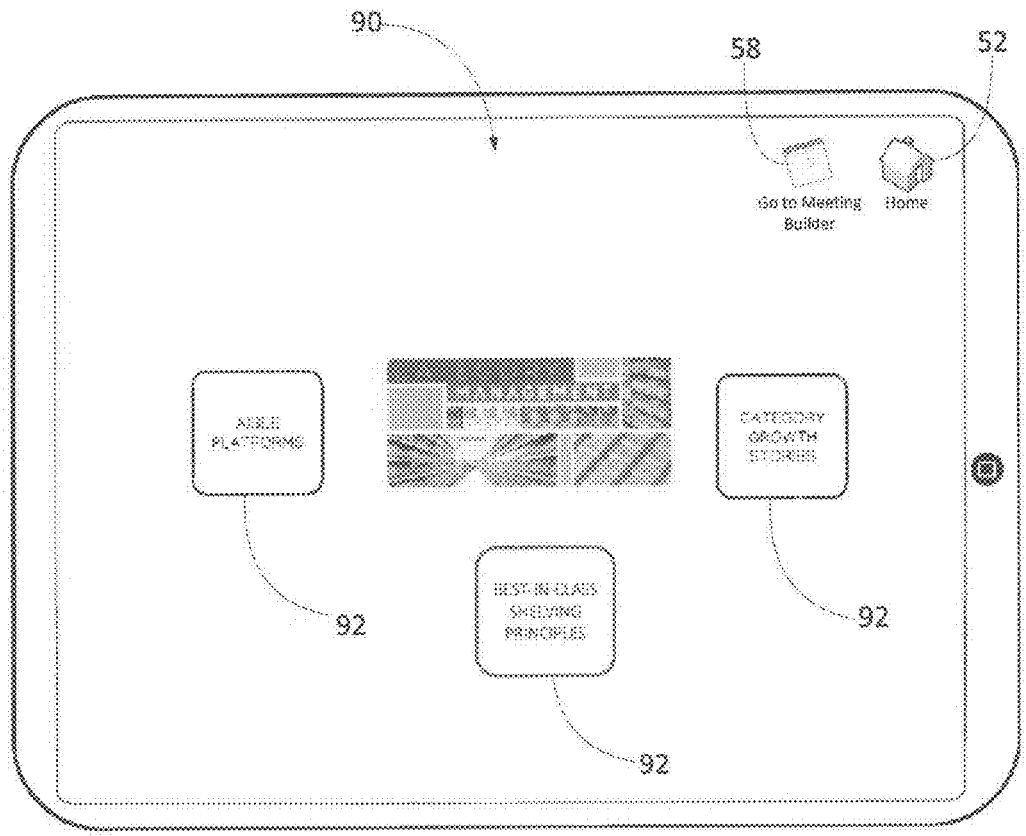
FIG. 9a is a depiction of a system for providing sales content including a tablet with a graphical user interface displaying a content area page according to some embodiments.
Figure 9B:
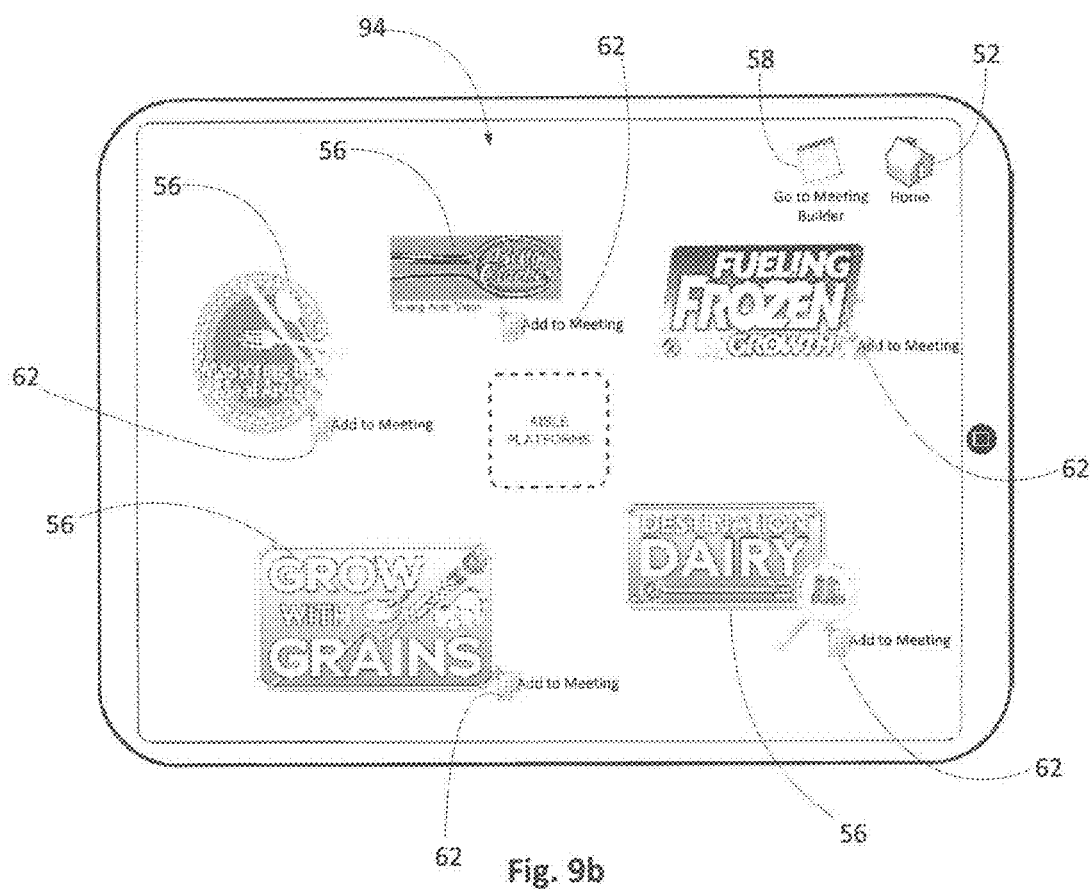
FIG. 9b is a depiction of a system for providing sales content including a tablet with a graphical user interface displaying a content selection page according to some embodiments.

In many cases, content can be easier to locate when it is grouped. In some embodiments, content selection pages can be used to group similar or related content. Depending on user preferences, content selection pages can be nested, such that tapping a content area element opens a content selection page with contains one or more content area elements. In this manner, content can be grouped so that it can be found by "drilling down" through a series of nested selection pages and area elements. In some embodiments, content area elements, including content area elements located on the home page, can be directly linked to a content area page. A content area page can have an element that provides a link to one or more content selection pages. An example of this indirect linking between the content area elements on the home page and a content selection page is shown in FIGS. 1, 9a, and 9b. In this case, the Category Management content area element 32 is directly linked to a content area page 90 illustrated in FIG. 9a, which provides a convenient grouping of subtopics within this content area. The content area page 90 includes a number of content selection page elements 92, each linked to a corresponding content selection page. One example of such a content selection page 94 is shown in FIG. 9b, which can be navigated to by selecting the content selection page element 92 corresponding to "Aisle Platforms" in FIG. 9a. Once on the content selection page, a user can access one or more content portions through corresponding content portion elements 56 and/or change access (e.g., remove and/or add access) to the content portions from a meeting presentation page using corresponding selection controls 62.

Returning to FIG. 1, several examples for grouping content can be seen according to the particular embodiment being illustrated. For example, content in this example is grouped by food type (e.g. drinks and snacks), financial information (e.g. projections, profit center and sales info), emerging market segments (e.g. gluten free, new products and news), and by shopper preferences (e.g. brand management and shopper's view). Depending on the particular needs of a supplier, or of a sales agent, any number of new or revised content selection pages, and their corresponding content area elements can be created, populated and used.

Returning now to FIG. 3, the content selection page 54' includes three selection controls 62, with each selection control 62 located below, and linked to, one of the content portion elements 56. In some embodiments each of the selection controls 62 can have one of two states: "selected" or "unselected." A selection control with a "selected" state can indicate the selection status of the corresponding content portion. Consequently, content portions can have either a "selected" or "unselected" status; the content portion status determined by the status of the linked selection control. Content portions which are selected can be added to, and included in, a meeting (which is discussed in greater detail below), while unselected content portions are removed from, and not included in, a meeting. As a result, from a content selection page, a user can view some of the content portion elements 56 which are available (and which are linked to corresponding content portions) and can select content portions for inclusion in a meeting. In some cases, tapping on a content portion element can launch the corresponding content portion; in the case of the three content portion elements 56 depicted in FIG. 3, a user can launch and view three videos from this page.

Figure 7:
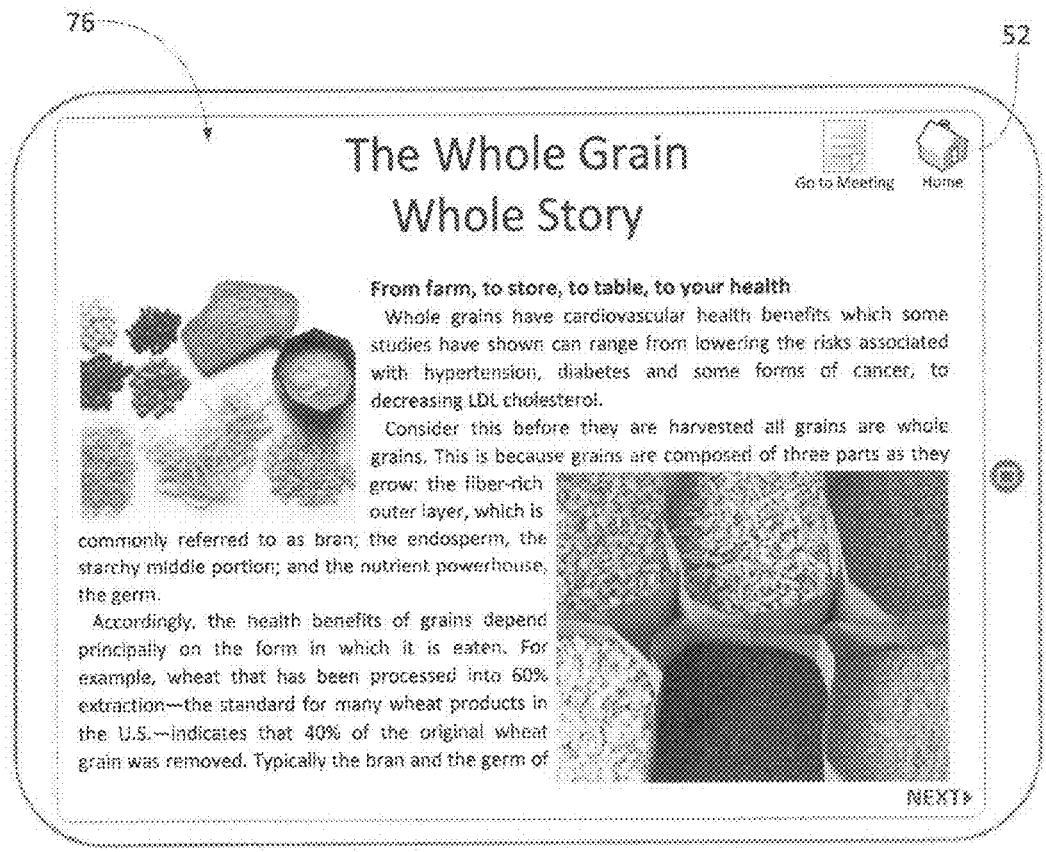
FIG. 7 is a depiction of a system for providing sales content including a tablet with a graphical user interface displaying a content portion page according to some embodiments.

FIG. 4 depicts a second example of a content selection page 54" that contains content portion elements 56 which in this example relate to a shopper's point of view. On this page, the four available content portion elements 56 are linked to content portions which are formatted as slide shows. Tapping on a content portion element 56 launches the corresponding content portion. For example, FIG. 7 depicts an example of a slide show content portion 76—that may be launched by tapping on the corresponding content portion element 56 on the selection page in FIG. 4. Returning to FIG. 4, tapping on a selection control 62 toggles the selection control from selected (in this example depicted as a checkmark overlaid on a meeting notice) to unselected (depicted as a plus sign overlaid on a meeting notice). Selection control icons can be symbol-based (i.e. an empty box vs. a box with a checkmark), color-based (i.e. a red vs. green circle), text based, or any combination of these or other suitable icon representations for "selected" and "unselected". As depicted in the examples of FIGS. 3 and 4, selection controls are shown with a combination of symbols and text, which may be helpful to remind a user that the selection control can be toggled from one state to the other.

Content selection pages 54' and 54" shown in FIGS. 3 and 4 can also include a meeting landing page element 58 and a home element 52. Tapping on a meeting landing page element 58 can load the meetings landing page 42, which can facilitate navigation from one page to another. In addition, other navigation keys can be added, according to user preferences, to selected pages in order to ease navigation to frequently used pages, or between two or more pages which may be often used one after the other. Tapping on the home element 52 can load the home page 24, and a user can select from one of the content area elements 32 or the meeting page element 26, in order to navigate to each of the respectively linked pages.

In some embodiments, adding and/or deleting content to a specific sales meeting can start from the meetings landing page. From the meetings landing page, a user can select a sales meeting element and make the corresponding sales meeting "active." Content that is subsequently added or removed, can then be added to, or removed from, the active meeting. Once a user has completed adding and/or removing content, the user can then return to the meetings landing page in order to save any changes that may have been made, and choose another meeting to set as active, if so desired. In some embodiments, adding and/or deleting content to a specific sales meeting can start from a meeting presentation page. From a meeting presentation page, a user can select a "change content" icon which can make that sales meeting "active." Content that is subsequently added or removed can then be added to, or removed from, the active meeting. Once a user has completed adding and/or removing content, the user can then return to the meeting presentation page in order to save any changes that may have been made. A user could then navigate to another meeting presentation page in order to set that meeting as active, if so desired. In some embodiments, adding content to a specific meeting can start from either one of the meetings landing page or from each meeting presentation page.

Once content has been added to a meeting presentation page, navigation to that content can be greatly streamlined during the actual sales presentation. A tablet can be a suitable tool for delivering sales content, but in some cases navigating to content within a native file directory structure used to store the content can be disruptive to the flow of a sales pitch. Creating sales meetings within the software suite can be an effective way to provide a sales agent with a central location of links to the pre-selected content that is relevant for each sales meeting, alleviating the need to navigate from page to page, within a file directory, in order to find the desired content. At the same time, the software suite permits the sales agent to easily navigate away from a meeting presentation page, in order to present other information that may be requested by a buyer. In the event other information has been presented, a sales agent can also quickly return to the meeting presentation page and resume the sales pitch.

Figure 5:
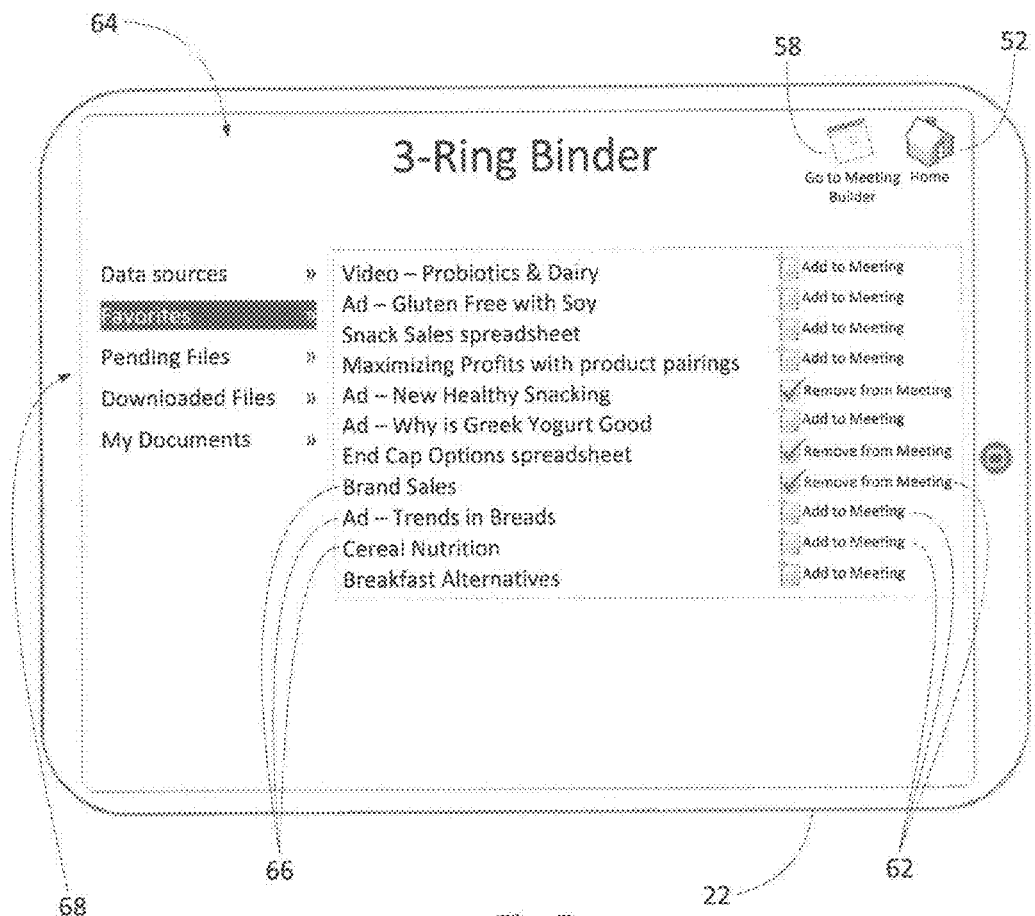
FIG. 5 is a depiction of a system for providing sales content including a tablet with a graphical user interface displaying a user content page according to some embodiments.

As shown in FIG. 1, in some embodiments the home page 24 can have a user content page element 34. Tapping on the user content page element 34 can load a user content page 64, an example of which is depicted in FIG. 5. A user content page 64 can have a plurality of selection controls 62, each of which can be linked to a user content portion element 66, such that each user content portion element 66 can be linked to a corresponding individual selection control 62, as depicted in the example shown in FIG. 5. As with selection controls found on content selection pages, selection controls 62 on a user content page 64 can also be toggled from selected to unselected, which indicates the selection status for each respectively linked user content portion. User content portions which are selected can be added to, and included in, a meeting, while unselected user content portions are removed from, and not included in, a meeting.

A user content portion can be any file that was created using one or more third party software applications. Depending on the software loaded on the tablet, tapping on a user content portion may optionally open the associated software application in order to launch the content.

In some embodiments, the user content page 64 can provide navigation controls 68 that can correspond with a sales agent's main computing device, such as a desktop computer. In this manner, content that is stored on the sales agent's network-connected "my documents" folder, for example, can be accessed from the user content page. When a network connection is available, the software suite may optionally activate synchronization of the sales agent's "my documents" folder structure, copying the folder structure (including the file names) to the tablet's hard drive, and thus making that folder structure locally accessible when the tablet is being used remotely. As a result, a sales agent can navigate through their folder structure to find a file that may become needed during a sales call. That file can then be marked for downloading to the tablet. Downloading can be done over Wi-Fi, 3G, 4G, or any other suitable mobile data connection. Because the folder structure itself has been synchronized, and stored locally, navigating to a desired file can be done relatively quickly. A marked file can then download while other content can be displayed on the tablet during a sales meeting. When the file has been downloaded, it can then be launched.

Consequently, navigation controls 68 can include, for example, files that are currently being downloaded ("Pending Files"), files that have been marked, and that have completely downloaded ("Downloaded Files") and "Favorites" which can correspond to files that have been downloaded while a higher speed network connection was available, in anticipation of being required. Finally, "Data Sources" can permit navigation to shared resources, which can be located on a SharePoint site, for example. The folder structure used on a shared resource site can be locally copied to the tablet's hard drive, in a manner similar to that for copying a sales agent's "my documents" folders. Doing so can make navigation through the shared folder structure relatively fast.

Figure 6A:
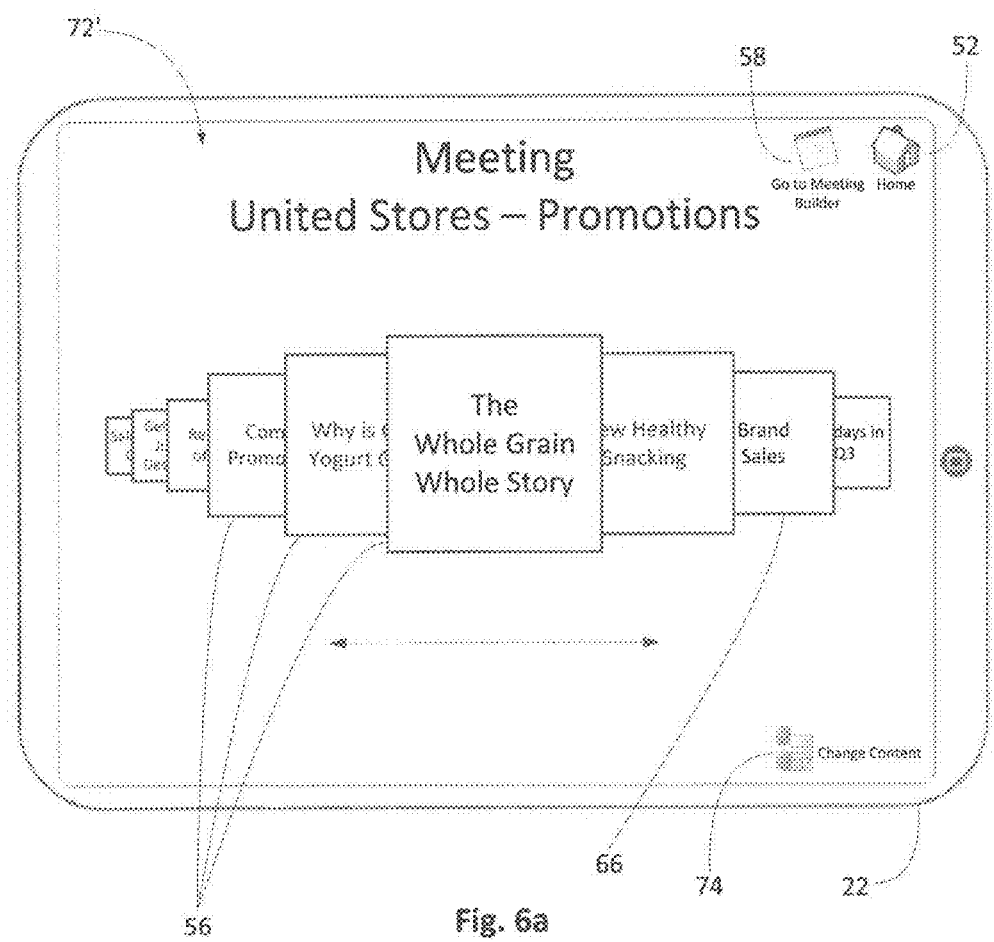
FIG. 6a is a depiction of a system for providing sales content including a tablet with a graphical user interface displaying a meeting presentation page according to some embodiments.
Figure 6B:
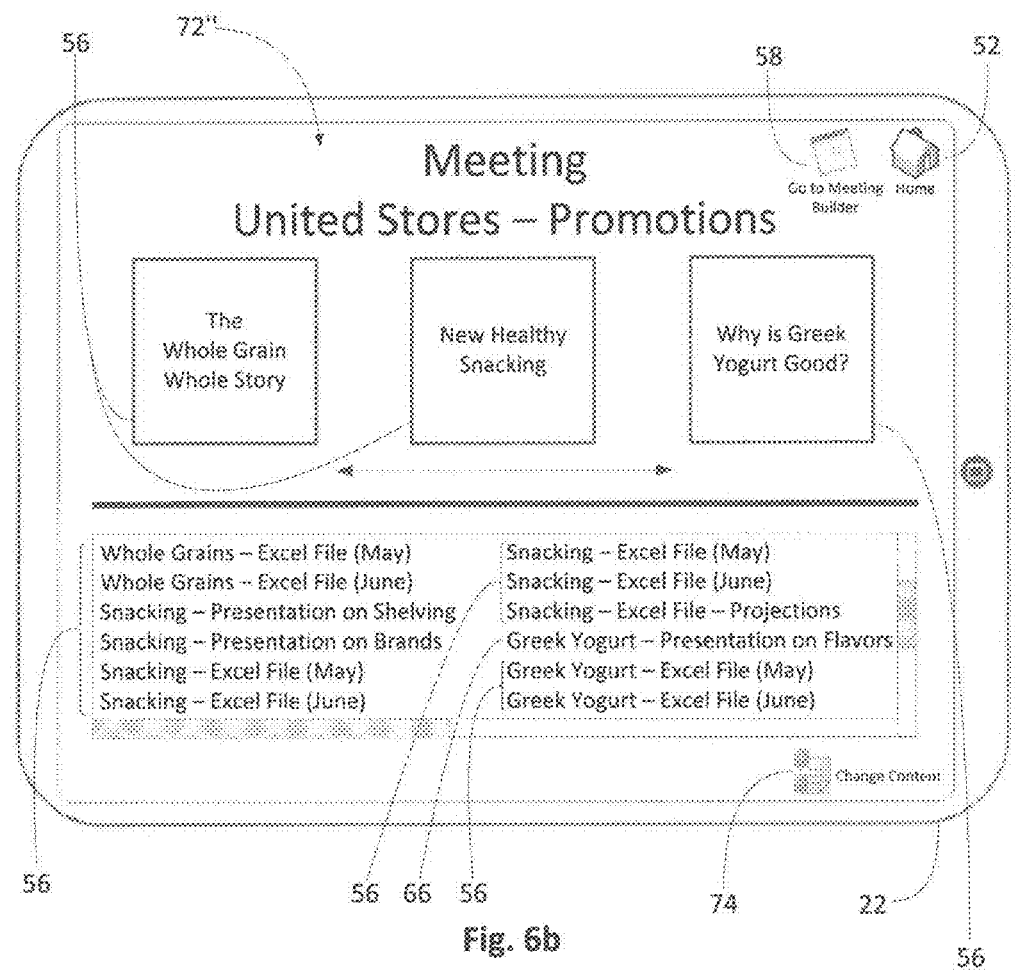
FIG. 6b is a depiction of a system for providing sales content including a tablet with a graphical user interface displaying a meeting presentation page according to some embodiments.

FIGS. 6a and 6b illustrate two possible examples of meeting presentation pages 72', 72" respectively, according to some embodiments. A sales agent can use the meeting presentation page 72' or 72" as the hub for a sales meeting presentation. Tapping a sales meeting element 44 from the meetings landing page 42 (FIG. 2) can load a meeting presentation page such as one of the meeting presentation pages 72', 72" depicted in FIGS. 6a and 6b respectively, according to some embodiments. A meeting presentation page 72' or 72" can have one or more content portion elements 56 (e.g., linked to a content portion 76) and/or one or more user content portions elements 66 linked to content uploaded by the sales agent. Tapping on a user content portion element 66 or content portion element 56 can cause the linked content portion to launch. As described above, adding content to a specific sales meeting can start from a meeting presentation page. A change content element 74 can be provided; tapping on the change content element 74 can set the sales meeting as "active" and content can subsequently be added to the "active" meeting either from a list structure of the content elements launched within the meeting presentation page 72 or by navigating to a content selection page such as in FIG. 8a or 9b and adding content portions by tapping the selection control elements 62.

Of course, numerous visual arrangements of a meeting presentation page are optionally possible. In the meeting presentation page 72' depicted in FIG. 6a, the content portion elements 56 (including one user content portion element 66) are arranged in the center of the screen so that a user can "shuffle" the content portion elements 56 in order to move each element, and in succession bring each element to the foreground for selection. In the meeting presentation page 72" depicted in FIG. 6b, some of the content portion elements 56 are arranged in the upper portion of the screen, while other content portion elements 56 (including one user content portion element 66) are arranged in the lower portion of the screen. This arrangement can assist a user by distinguishing content that a sales agent intends on covering during a sales presentation (those arranged in the upper portion of the screen) from content that the sales agent anticipates a buyer will request, and to content that is simply prudent to have available (those arranged in the lower portion of the screen). In some cases, one or more areas of the meeting presentation page can also or instead be dedicated exclusively to user content portion elements 66, providing a concise listing of all of the content specifically uploaded by the sales agent.

In the figures, various pages of the GUI 20 (e.g., the home page 24, the meetings landing page 42, the content selection pages 54, the user content page 64 and the meeting presentation page 72) are depicted with a particular display configuration or format. Of course it should be appreciated that the examples of GUI pages depicted and described herein are merely examples of how such pages could be formatted/configured and that any of a multitude of possible display formats, configurations, and styles, may be used. In some cases a particular display format may be chosen based on the ease of using that display format to find, and select an element from each page. Depending on the number of elements on each page, the size, shape and color of each element, and a user's individual preference, one display format may be preferred over others. Indeed, many alternative display formats are possible, and can be substituted for the examples depicted in the figures. Other possible display formats include, but are not limited to, a grid of icons; a text-based list (which can be alphabetized); an album flip display, which appears to mimic the look of a traditional roll-a-dex (lying on its side); a book page display to flip from one page (icon) to the next; an icon circle, which can sequentially bring each icon to the foreground; or a left to right scroll (as depicted for the meetings landing page and the meeting presentation page).

Figure 8A:
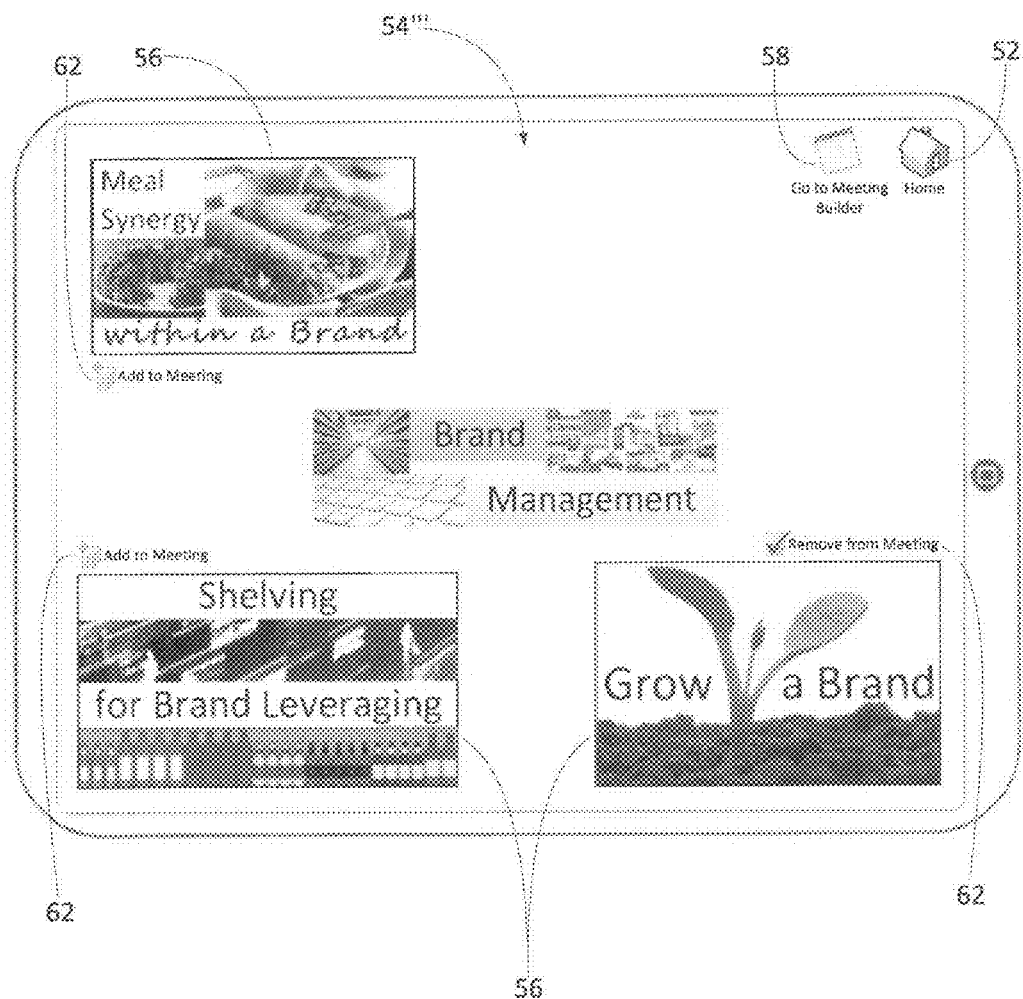
FIG. 8a is a depiction of a system for providing sales content including a tablet with a graphical user interface displaying a content selection landing page according to some embodiments.
Figure 8B:
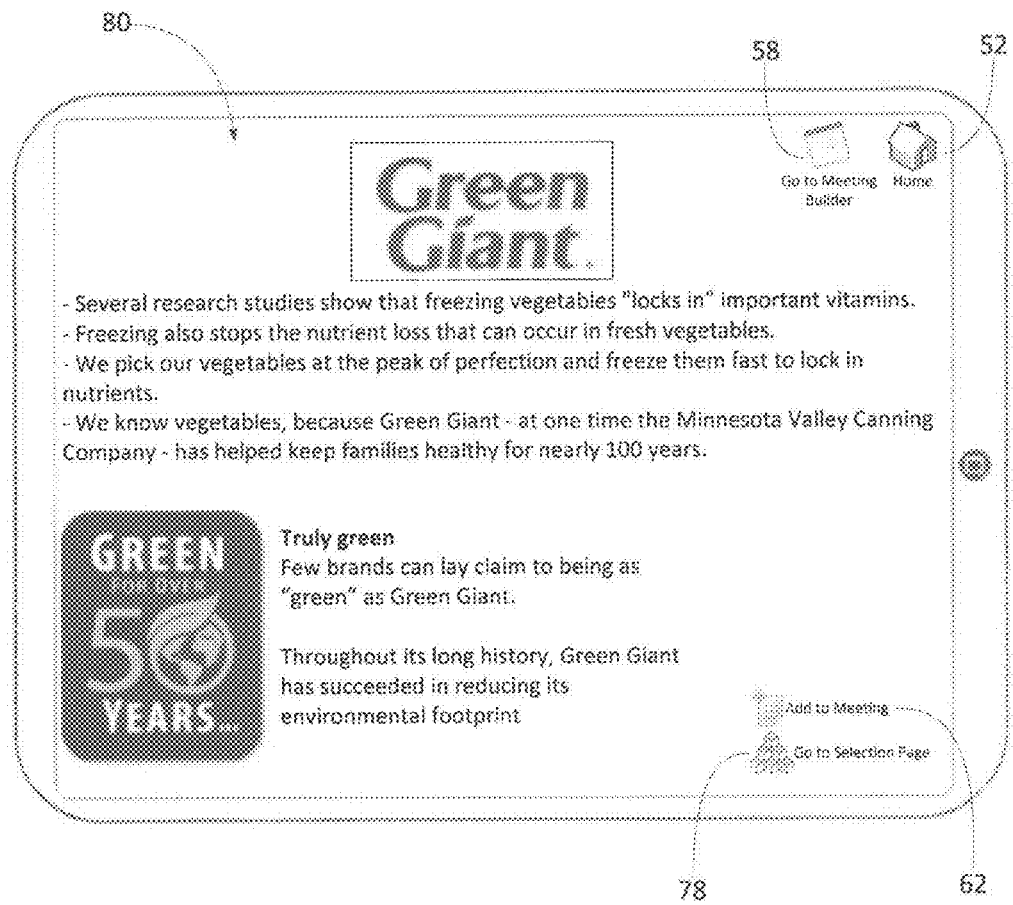
FIG. 8b is a depiction of a system for providing sales content including a tablet with a graphical user interface displaying a content selection page according to some embodiments.

Referring to FIGS. 1, 8a, and 8b, a method for building a meeting presentation page with a tablet computer will now be described according to some embodiments. As mentioned above, a sales page can provide one manner of accessing sales content for viewing with a computing device, such as a tablet computer, during a sales meeting. Referring to FIG. 1, according to one embodiment, a user can use the system 10 to launch the software suite on the tablet 22 in order to view the GUI 20 of the system 10. Using the GUI, the user can navigate to the home page 24, which in this case displays the meeting page element 26 and multiple content area elements 32. The user can then tap on a content area element 32 from the home page 24 in order to navigate (e.g., directly or indirectly) to a content selection page.

A third example of a content selection page 54''' is depicted in FIG. 8a. From this content selection page 54''', the user can then tap one of the selection controls 62 in order to change the corresponding content portion from being included in, to being excluded from, a meeting presentation page, and conversely from being excluded from, to being included in, a meeting presentation page. In the example of the content selection page 54''' depicted in FIG. 8a, if a user were to tap the selection control 62 that is located above the "Shelving for Brand Leveraging" content portion element 56, the corresponding content portion 76 would be added to the meeting presentation page. In addition, if a user were to tap the selection control 62 that is located above the "Grow a Brand" content portion element 56, the corresponding content portion 76 would be removed from the meeting presentation page. In a similar manner, if the content selection page contained a user content portion element 66, tapping on the corresponding selection control 62 would add the user content portion to a meeting presentation page, or remove the user content portion from the meeting presentation page, depending on the initial state of the selection control 62 (selected/unselected).

Continuing now with the example, if a user were to tap the selection control 62 that is located above the "Shelving for Brand Leveraging" content portion element 56, the corresponding content portion 76 would be added to a meeting presentation page. As a result, when the user then navigates to the meeting presentation page, the "Shelving for Brand Leveraging" content portion 76 would be available for viewing from the meeting presentation page without further navigation between pages, and it could be launched directly from the meeting presentation page. In some embodiments, the "Shelving for Brand Leveraging" content portion 76 would be available for viewing directly from the meeting presentation page because the corresponding "Shelving for Brand Leveraging" content portion element 56 has been added to the meeting presentation page as a result of the user's tapping the selection control 62.

Continuing still with the example, if a user were to tap the selection control 62 that is located above the "Grow a Brand" content portion element 56, the corresponding content portion 76 would be removed from the meeting presentation page. As a result, when the user then navigates to the meeting presentation page, the "Grow a Brand" content portion 76 would not be available to launch directly from the meeting presentation page.

Remaining still with the example, tapping on the "Green Giant" content area element 32 from the home page 24 would result in loading the "Green Giant" content area page 80, as depicted in FIG. 8b. The content area page 80 can include a content selection page element 78, which can be linked to a corresponding content selection page. In this example, tapping on the content selection page element 78 would cause the "Brand Management" content selection page 54''' (FIG. 8a) to load.

In some embodiments, the "Shelving for Brand Leveraging" content portion 76 would be available for selection and viewing from the meeting presentation page because the corresponding "Shelving for Brand Leveraging" content portion element 56 has been added to the meeting presentation page as a result of the user's tapping the selection control 62. A user could navigate to the meeting presentation page by first returning to the home page 24 and then tapping the meeting page element 26 which can load either a meeting presentation page directly, or can load a meetings landing page 42 that can display one or more sales meeting elements 44, which if tapped, would load a corresponding meeting presentation page. Loading each meeting presentation page would permit a user to view the sales content that was selected for each particular sales meeting.

According to some embodiments, content can be loaded into the system 10 (e.g., into the tablet 22 and the software suite residing in memory therein) from a variety of sources. Some content can be embedded within the software suite application itself. This type of content can include the images for buttons, keys, navigation tools and other similar symbols and representations. The sales content portions, which can include spread sheets, documents, video clips, images, charts and other sales content can be loaded into the tablet 22. This content can be loaded from one or more central databases that can be accessed through a network or a web application platform. Access can either be through a hard wired connection, over Wi-Fi, using a 3G/4G connection, or through any other wireless networking protocol that may be in use.

Some content can remain on the database, while some content can be copied to the tablet's local hard drive (e.g., a flash memory hard drive). Any combination of database storage and/or local storage is possible depending on many factors, such as: the available memory on a tablet's hard drive; the file size of the content; the available wireless connection speeds; the reliability of available wireless connections; and/or the likelihood of needing the content on the tablet.

Typically, content that is stored, regardless of location, can be version controlled; in this manner, the content used in a sales presentation can be the most recent version available. When newer versions become available on a database, they can be downloaded in order to replace older versions that may have been locally stored on a tablet. This can occur, when the tablet is connected to the network via a relatively high speed connection. The suite can periodically check for content changes (new, changed or deleted), and/or a user can trigger a content update in order to synchronize any content that may have been locally stored, with the content available from the database. Thus, in some embodiments, the suite can be an occasionally-connected application whereby a local repository of information is retained for non-connected use, and then when a data connection is available additional processing and/or data handling may be utilized.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A method for generating sales presentations and displaying sales content, comprising:
   displaying a home page using a computing device comprising processing circuitry and an electronic display, the home page comprising a meeting page element and a plurality of content area elements,
   the meeting page element being linked to at least two meeting presentation pages, wherein the at least two meeting presentation pages include an active meeting presentation page to which content is being added or removed and an inactive meeting presentation page whose content is not being changed, and
   the plurality of content area elements each being linked to a respective content selection page containing content that can be added or removed from the active meeting presentation page using selection controls, the selection controls having a selected state and an unselected state;
   determining, with the processing circuitry, which of the at least two meeting presentation pages is selected as the active meeting presentation page;
   determining, with the processing circuitry, the state of the selection controls and, for each selection control placed in the selected state, adding with the processing circuitry content corresponding to the selection control in the selected state to the active meeting presentation page, and for each selection control placed in the unselected state, removing with the processing circuitry content corresponding to the selection control placed in the unselected state from the active meeting presentation page; and
   displaying the active meeting presentation page including at least a portion of the content added to the active meeting presentation page using the selection controls with the electronic display of the computing device.

2. The method of claim 1, wherein the meeting page element is indirectly linked to the at least two meeting presentation pages through a meetings landing page comprising at least one sales meeting element linked to the active meeting presentation page and at least one sales meeting element linked to the inactive meeting presentation page.

3. The method of claim 2, wherein the meetings landing page comprises a new sales meeting control, and further comprising detecting manipulation of the new sales meeting control with the processing circuitry and after detecting the manipulation of the new sales meeting control, generating an additional meeting presentation page and adding an additional sales meeting element to the meetings landing page, the additional sales meeting element linked to the additional meeting presentation page.

4. The method of claim 1, further comprising detecting manipulation on the active meeting presentation page of a content portion element linked to the content corresponding to the selection control with the processing circuitry and, after detecting the manipulation of the content portion element, displaying the content linked to the content portion element on the active meeting presentation page.

5. The method of claim 4, wherein the content selection page further comprises content portion elements corresponding to the content selection controls, and for each selection control in the selected state, the processing circuitry adds a content portion element corresponding to the selection control in the selected state to the active meeting presentation page.

6. The method of claim 5, wherein a number of links connecting the active meeting presentation page and the content corresponding to the selection controls is less than or equal to a number of links connecting the content selection page and the content corresponding to the selection controls.

7. The method of claim 1, wherein at least one of the plurality of content area elements on the home page is a user content page element linked to at least one user content selection page, the at least one user content selection page comprising selection controls having the selected state and the unselected state, each of the selection controls corresponding to respective user content, wherein the selection controls have the selected state and the unselected state, and placing each selection control in the selection state adds the respective user content corresponding to the selection control to the active meeting presentation page and placing the selection control in the unselected state removes the respective user content corresponding to the selection control from the active meeting presentation page.

8. The method of claim 7, wherein the respective user content portion comprises a computer file created by a third party software application.

9. A system for generating sales meetings presentations and providing sales content, comprising a portable computing device comprising an electronic display and processing circuitry, the processing circuitry configured to:
   display a home page on the electronic display, the home page comprising a meeting page element linked to at least two meeting presentation pages and a plurality of content area elements;
   detect manipulation of the meeting page element and selection of one of the at least two meeting presentation pages as an active meeting presentation page to which content is being added or removed;
   display the active meeting presentation page corresponding to the detected manipulation of the meeting page element;
   detect manipulation of one of the plurality of content area elements, and after detecting the manipulation of the content area element, display a content selection page corresponding to the manipulated content area element;
   display a selection control on the content selection page corresponding to content configured to be one of added or removed from the meeting presentation page using the selection control;
   determine a state of the selection control, the state comprising a selected state and an unselected state, wherein, when the selection control is placed in the selected state, content corresponding to the selection control is added to the active meeting presentation page by adding a content portion element linked to the content to the meeting presentation page and, when the selection control is placed in the unselected state, content corresponding to the selection control is removed from the active meeting presentation page by removing the content selection portion element linked to the content,
   display the active meeting presentation page with the electronic display;
   detect a manipulation of the content portion element on the active meeting presentation page; and
   display the content corresponding to the content portion element in response to detecting the manipulation of the content portion element.

10. The system of claim 9, wherein the processing circuitry is further configured to display a meetings landing page upon detecting manipulation of the meeting page element, the meetings landing page comprising sales meeting elements linked to each of the at least two meeting presentation pages, and display the active meeting presentation page upon detecting a manipulation of a sales meeting element corresponding to the active meeting presentation page.

11. The system of claim 10, wherein the meetings landing page comprises a new sales meeting control, and wherein the processing circuitry is further configured to detect manipulation of the new sales meeting control and after detecting the manipulation, generate an additional meeting presentation page and add an additional sales meeting element to the meetings landing page, the additional sales meeting element linked to the additional meeting presentation page.

12. The system of claim 9, wherein the processing circuitry comprises a programmable processor and a memory component storing instructions for execution by the programmable processor.

13. The system of claim 12, further comprising a tablet computer providing the electronic display and the processing circuitry, and wherein the electronic display comprises a touch-sensitive screen providing an input-output interface for the processing circuitry.

14. A method, comprising building a meeting presentation page with a tablet computer that provides access to sales content for viewing with the tablet computer during a sales meeting, the building the meeting presentation page comprising:
   opening a sales application by manipulating an application graphical user interface (GUI) element with the tablet computer;
   navigating to a home page of the sales application, the home page comprising a meeting page GUI element providing access to at least two meeting presentation pages and a content area GUI element providing access to a content selection page;
   manipulating one or more GUI elements to select one of the at least two meeting presentation pages for adding or removing content, thereby providing an active meeting presentation page;
   manipulating one or more GUI elements to display the content selection page with the tablet computer, starting with manipulating at least the content area GUI element on the home page;
   manipulating a GUI selection control on the content selection page, wherein the GUI selection control is configured to be placed in one of a selected state and an unselected state, and in response to manipulating the GUI selection control to the selected state, content corresponding to the GUI selection control is added to the active meeting presentation page by adding a content portion element linked to the content to the active meeting presentation page, and, in response to manipulating the GUI selection control to the unselected state, content corresponding to the GUI selection control is removed from the active meeting presentation page by removing the content selection portion element linked to the content; and
   wherein the content portion element is selectable and, upon selection, causes the content linked to the content portion element to be displayed by the tablet computer.

15. The method of claim 14, wherein manipulating the one or more GUI elements to display the content selection page consists of manipulating the content area GUI element on the home page.

16. The method of claim 14, wherein manipulating the one or more GUI elements to display the content selection page comprises manipulating the content area GUI element to display a content area page comprising a content selection page GUI element and manipulating the content selection page GUI element to display the content selection page.

17. The method of claim 14, wherein the content selection page comprises a user content selection page and the content linked to the content portion element comprises a computer file created by a third party software application.

18. The method of claim 14, further comprising accessing the sales content during the sales meeting with the tablet computer, the accessing the sales content comprising manipulating the meeting page element to access the active meeting presentation page.

19. The method of claim 18, wherein accessing the sales content further comprises manipulating the meeting page element to display a meetings landing page and manipulating a sales meeting element on the meetings landing page linked to the active meeting presentation page.

20. The method of claim 19, wherein the meetings landing page comprises a plurality of sales meeting elements, each sales meeting element corresponding and linked to a respective meeting presentation page.

21. The method of claim 14, further comprising building a plurality of meeting presentation pages with the tablet computer for viewing with the tablet computer during different sales meetings respectively corresponding to each meeting presentation page.

* * * * *